(12) United States Patent
Salanda

(10) Patent No.: US 7,677,139 B2
(45) Date of Patent: Mar. 16, 2010

(54) ENGINE TURNING DEVICE

(75) Inventor: David M. Salanda, Burlington, WI (US)

(73) Assignee: Jonco Industries, Inc., Milwaukee, WI (US)

( * ) Notice: Subject to any disclaimer, the term of this patent is extended or adjusted under 35 U.S.C. 154(b) by 0 days.

(21) Appl. No.: 11/897,384

(22) Filed: Aug. 30, 2007

(65) Prior Publication Data

US 2009/0056032 A1    Mar. 5, 2009

(51) Int. Cl.
*B25B 13/06* (2006.01)
*B25B 13/48* (2006.01)

(52) U.S. Cl. ..................................... 81/124.2; 81/125.1
(58) Field of Classification Search ............... 81/124.2, 81/125.1, 176.2, 180.1, 185
See application file for complete search history.

(56) References Cited

U.S. PATENT DOCUMENTS

| | | | | |
|---|---|---|---|---|
| 1,226,228 A * | 5/1917 | McKinzie | ................ | 81/125.1 |
| 1,281,438 A * | 10/1918 | Tuttle | ................ | 81/124.5 |
| 3,838,614 A * | 10/1974 | O'Donnell | ................ | 81/60 |
| 3,875,829 A * | 4/1975 | Evans et al. | ................ | 81/185 |
| 4,171,653 A * | 10/1979 | Holloway, Jr. | ................ | 81/180.1 |
| 4,372,263 A | 2/1983 | Costa | | |
| 4,580,446 A * | 4/1986 | Ansteth | ................ | 73/114.64 |
| 4,580,534 A | 4/1986 | Blum et al. | | |
| 4,615,311 A | 10/1986 | Scheckel | | |
| 4,794,683 A | 1/1989 | Pacheco | | |
| 4,873,899 A * | 10/1989 | Mazurek | ................ | 81/63 |
| 4,922,749 A * | 5/1990 | Steffes et al. | ................ | 73/114.26 |
| 4,929,111 A * | 5/1990 | Lauritano | ................ | 403/16 |
| 5,123,314 A | 6/1992 | Wittmann | | |
| 5,172,615 A * | 12/1992 | Albrecht | ................ | 81/436 |
| 5,607,247 A * | 3/1997 | Lauritano | ................ | 403/16 |
| 5,794,997 A | 8/1998 | Lewton, Jr. | | |
| 6,065,375 A | 5/2000 | Leonard | | |
| 6,595,090 B1 | 7/2003 | McQuillin | | |
| 7,334,506 B2 * | 2/2008 | Hui | ................ | 81/124.4 |
| 2007/0163405 A1 * | 7/2007 | Hsieh | ................ | 81/177.85 |

OTHER PUBLICATIONS

Powerhouse Catalog Web Pages; 8 pages; Jun. 26, 2007.

* cited by examiner

*Primary Examiner*—David B Thomas
(74) *Attorney, Agent, or Firm*—Ryan Kromholz & Manion, S.C.

(57) ABSTRACT

An engine turning device for use in rotating the crankshaft of an engine. The device has a first structure on a first side used when coupling the device to an engine employing a harmonic balancer and a second structure on a second side used when coupling the device to an engine that does not have a harmonic balancer or if the harmonic balancer has been removed.

12 Claims, 4 Drawing Sheets

ENGINE TURNING DEVICE

BACKGROUND OF THE INVENTION

The present invention relates to barring and other devices used to rotate the crankshaft and move other components of an engine. The present invention also relates to devices that assist in properly timing an engine, its ignition and valve settings.

Engines are built to endure many hours of maintenance free service. These engines, however, do require repair and general maintenance. Some repairs are timing related problems, which require positioning the crankshaft and related components in a particular relationship to each other. In most instances the crankshaft is rotated to obtain this relationship, wherein the crankshaft is aligned with a marking or indicators located on the engine. If an engine is rebuilt, there also exists a need for a tool to easily rotate the crankshaft during installation of other engine components or to insure that previously installed components are functioning properly.

Most automotive engines have a harmonic balancer mounted or coupled to the crankshaft. The harmonic balancer, which functions as a vibration damper, is a device connected to the crankshaft front end to lessen the torsional vibration. When the cylinders fire, power gets transmitted through the crankshaft. The front of the crankshaft takes the brunt of this power, so it often moves before the rear of the crankshaft. This causes a twisting motion. Then, when the power is removed from the front, the halfway twisted shaft unwinds and snaps back in the opposite direction. Although this unwinding process is quite small, it causes "torsional vibration." To prevent this vibration, a harmonic balancer is attached to the front end of the crankshaft. The balancer is made of two pieces connected by a rubber sleeve or an outer portion pressed on over a rubber sleeve. When the power derived from ignition in a cylinder hits the front of the crankshaft, it tries to twist the heavy part of the damper, but ends up twisting the rubber sleeve connecting the two parts of the damper. The front of the crank can't speed up as much with the damper attached; the force is used to twist the rubber and speed up the damper wheel. This keeps the crankshaft operation calm.

However, some cars, especially custom made or designed cars, or specialty cars, may not have a harmonic balancer. Removal of the harmonic balancer can potentially improve power and performance.

In both engines with a harmonic balancer and engines without a harmonic balancer, it is possible that the timing, ignition, or valve settings may need to be adjusted and crankshaft rotated for the engine to run properly. Individual engine turning devices have been contemplated and designed to assist in proper timing functions. However, these barring devices are designed to work specifically with or specifically without a harmonic balancer. If the device is designed for the opposite arrangement, it is not helpful. That is, a device for use when the harmonic balancer is connected to the engine is not useful on an engine that does not have a harmonic balancer attached and vice versa. Thus, it would be useful to design a tool that is capable of assisting timing functions in either situation.

SUMMARY OF THE INVENTION

The present invention comprises a device for rotating a crankshaft of an engine, whether or not the engine and the crankshaft support a harmonic balancer. The device has a first end portion arranged to be removably coupled to the crankshaft and a second end portion arranged to be removably coupled to the harmonic balancer. The device further includes an opening for receiving a tool, such as a breaker bar or socket wrench/ratchet, which provides the required leverage for turning the crankshaft and moving the associated engine components.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
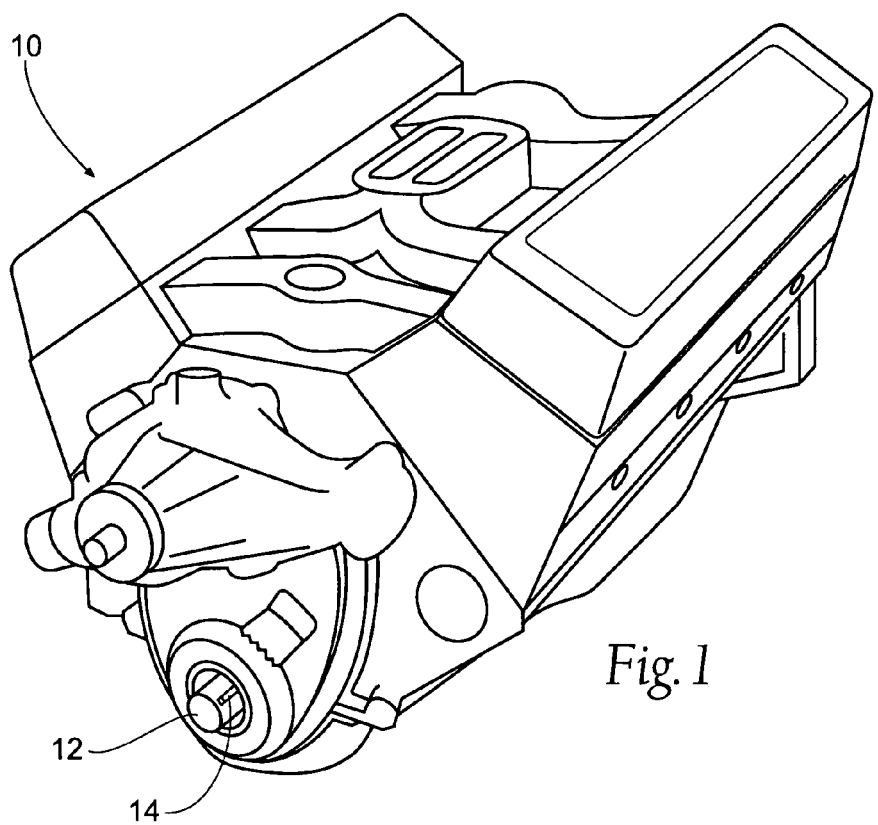
FIG. 1 is a perspective view of an engine without a harmonic balancer attached to the engine.

FIG. 1 is a perspective view of an engine 10. The engine 10 has a crankshaft 12. The crankshaft 12 has an outwardly extending spline 14, which will allow the crankshaft 12 to be engaged by an engine turning tool so that the crankshaft 12 can be turned to, for example, properly time the engine 10. The engine 10 can be of any type of internal combustion engine, such as Toyota, Honda, Ford, Chevrolet, and other types of engines, including small and big block engines, as well as engines having various numbers of cylinders.

Figure 2:
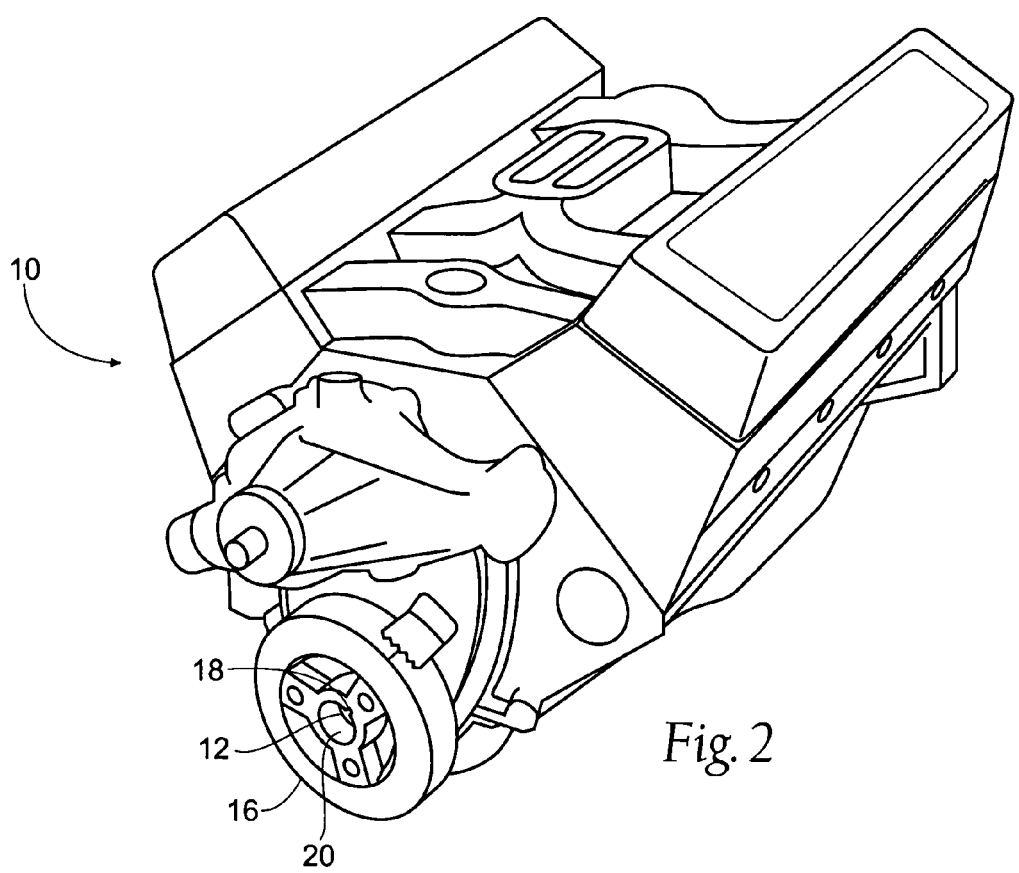
FIG. 2 is a perspective view of an engine having a harmonic balancer attached to the engine.

FIG. 2 is a perspective of the engine 10 of FIG. 1, with the crankshaft supporting a harmonic balancer 16, also referred to as a vibration or torsional balancer or torsional damper. The balancer 16 is found on many engines, generally used to reduce engine vibration. The balancer 16 normally has a keyway 18 located within a central opening 20, which provides an area for an engine turning device 100 to fittingly engage the balancer 16 to rotate the crankshaft of the engine 10, as was noted with respect to FIG. 1. As can be seen in FIGS. 1 and 2, the arrangement or design for an engine turning tool would be different, dependent on whether the engine 10 does or does not have a harmonic balancer 16 located on the crankshaft 12. Thus, prior art engine turning tools were designed for interaction with a engine that has a harmonic balancer attached or one that does not have a harmonic balancer attached, but tools have not been developed to accommodate both arrangements.

Figure 3:
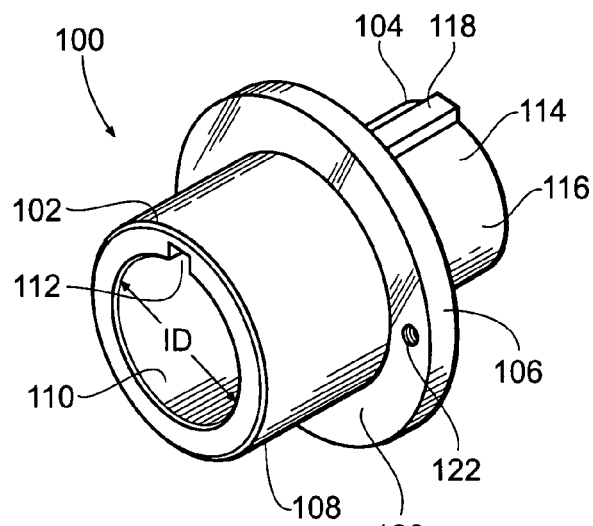
FIG. 3 is a perspective view of a device according to the present invention.

FIG. 3 is a perspective view of an engine turning device 100 according to the present invention that will accommodate engines that do and do not have a harmonic balancer attached to the crank shaft. The engine turning device 100 has a first end portion 102 and a second end portion 104, with a central portion 106 dividing the first end portion 102 from the second end portion 104. The central portion 106 can be of any size or dimension, but preferably has a greater diameter than both the first end portion 102 and the second end portion 104, so that the device 100 has a solid surface 126 to abut the crankshaft 12 or the balancer 16 when the device is fitted for interaction with the engine 10. The first end portion 102 generally comprises a cylindrical section 108 that has an inner surface 110 having an inner diameter that is sized to fittingly engage the crankshaft 12 of the engine 10 (see FIG. 7). The inner surface 110 has a keyway 112 that will engage the spline 14 located on the crankshaft 12 (see FIG. 1). It is to be understood that the inner surface 110 may have additional keyways (not shown) if necessary to engage additional splines located on a crankshaft. However, standard crankshafts generally are designed alike, with a single spline. The present invention is designed to be used in connection with a standard crankshaft having any diameter. The inner diameter, shown as ID in FIG. 3, will be slightly larger than the crankshaft diameter.

Still referring to FIG. 3, the second end portion 104 generally comprises a cylindrical section 114 that has an outer surface 116. The outer surface 116 has a spline 118 designed to fittingly engage the harmonic balancer 14 and the keyway 18 (see FIG. 2). As discussed with the first end portion 102, the second end portion could be provided with more splines 118 if needed to interact with a harmonic balancer designed with more than one keyway. The present invention is designed to be used in connection with a harmonic balancer having any diameter central opening 20. The outer diameter of the device 100, shown as OD in FIG. 4, will be slightly smaller than the central opening diameter.

Figure 4:
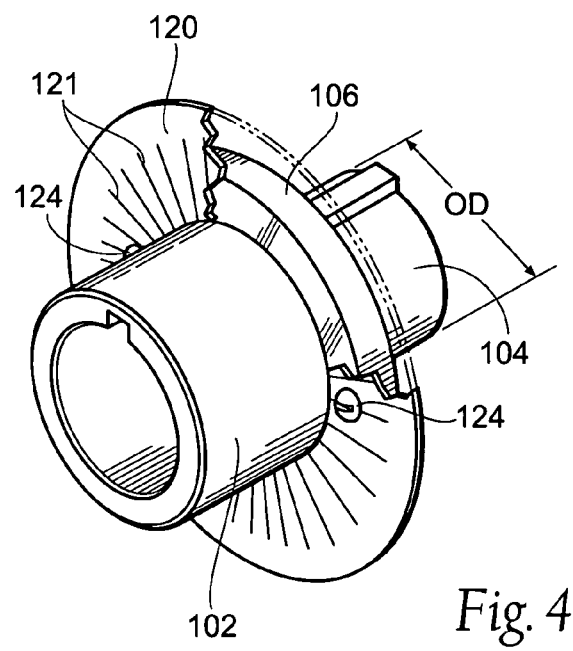
FIG. 4 is a perspective view of the device of FIG. 3 including a degree wheel.

Referring to FIG. 4, the engine turning device 100 is shown with a degree wheel 120 mounted onto the central portion 106. The degree wheel 120, which is preferably larger than the central portion 106 so that the degree wheel 120 can be properly aligned when being used, is shown as partially cut away so that the second end portion 104 is visible. The degree wheel 120 has degree markings 121, preferably from 0° to 360° to assist in properly turning and aligning the crankshaft 12 to confirm engine valve timing and ignition marks for TDC (top dead center). The central portion 106 preferably has a pair of diametrically opposed preformed holes 122 (see FIG. 3 and FIG. 5) that can be tapped to receive a pair of threaded bolts or screws 124 to secure the degree wheel 120 to the engine turning device 100, if desired. However, it is understood that any securing means, such as clips, clamps or adhesives, could be used to secure the degree wheel 120 to the central portion 106 and fall within scope of the present invention. Likewise, the engine turning device 100 is preferably designed so that the degree wheel 120 could be used in connection with the first end portion 102 or the second end portion 104. Alternatively, the engine turning device 100 could be designed so that one or two degree wheels 120 are permanently attached to the engine turning device 100, or integrally formed with the central portion 106.

Figure 5:
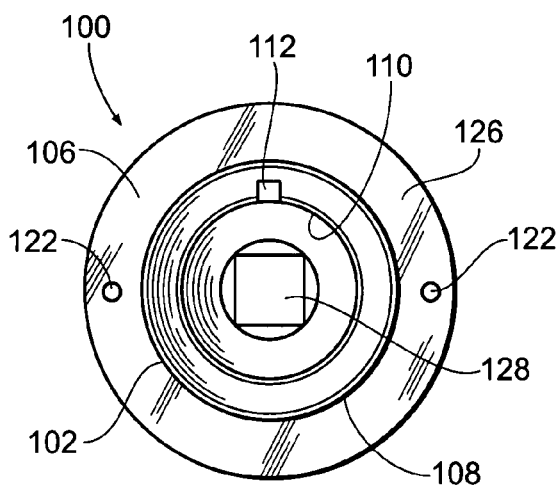
FIG. 5 is a front elevation view of the device of FIG. 3.

FIG. 5 shows a front view of the engine turning device 100. The first end portion 102 is centrally aligned with the central portion 106. A surface 126 of the central portion 106 provides an abutment when the engine turning device 100 is placed upon the crankshaft 12 or device 100 so that it is positioned to a sufficient depth to deliver torque to the crankshaft 12 without damaging the crankshaft 12. As previously noted, the first end portion 102 has the inside surface 110 with the keyway 112 to fittingly engage the crankshaft 12. The engine turning device 100 has a square bore 128, preferably a bore for receiving a standard size adaptor member, designed to receive a breaker bar, socket wrench/ratchet or other lever arm (not shown) to provide the necessary torque for rotating the crankshaft 12.

Figure 6:
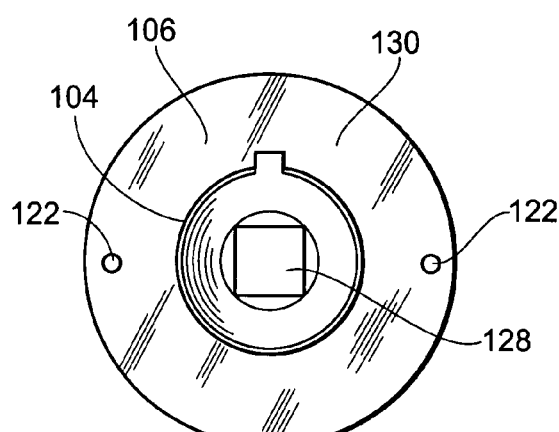
FIG. 6 is a rear elevation view of the device of FIG. 3.

FIG. 6 shows a rear view of the engine turning device 100. As with the first end portion 102, the second end portion 104 is preferably centrally aligned with the central portion 106. A second surface 130 provides an abutment for when the second end portion 104 is positioned on the harmonic balancer 14 (see FIG. 8) in the same fashion described for the first surface 126 in FIG. 5. The square bore 128 extends through the device 100 into the second end portion 104 to allow for the use of a breaker bar or other lever arm, as previously discussed. While the bore 128 passes through the engine turning device 100, it could be considered as two separate bores 128, with one located within each end portion 102, 104 of the barring device. Alternatively, the device 100 could be designed with two distinct bores 128, having a barrier located in the central portion 106 between the bores 128. Provided that a device has a structure for receiving a lever arm or similar device to be attached to the engine turning device 100, any of these arrangements, or other similar arrangements, will fall within the scope of the present invention.

Figure 7:
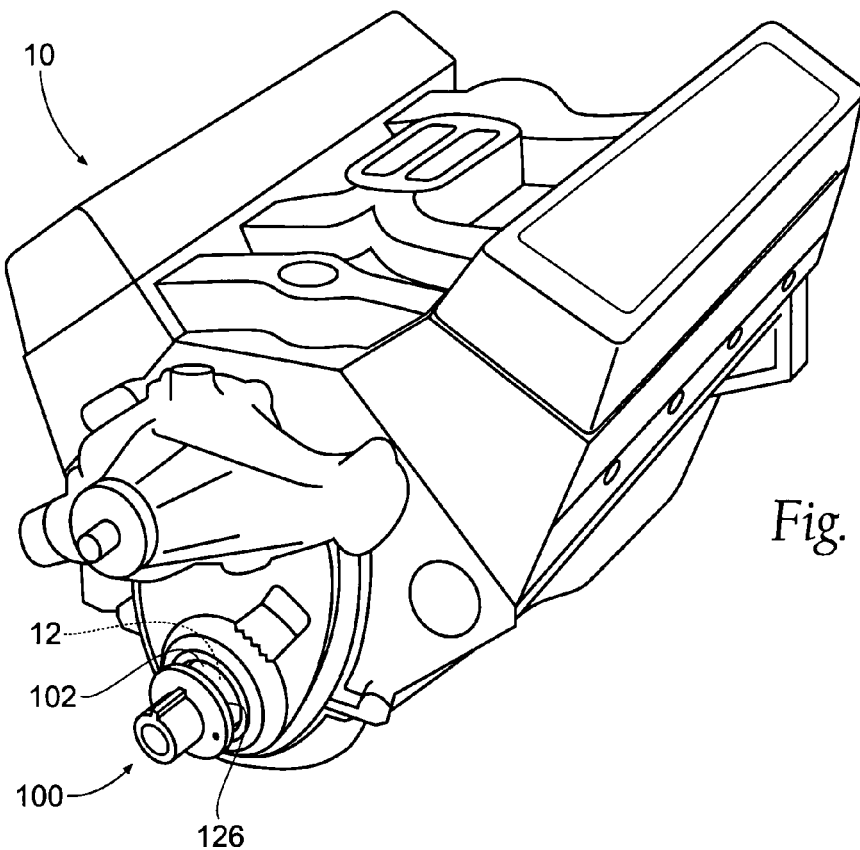
FIG. 7 is a perspective view of the device of FIG. 3 together with the engine block in FIG. 1.

FIG. 7 shows the engine turning device 100 secured to the crankshaft 12, as discussed with respect to FIG. 1. The first end portion 102 is fittingly mated with the crankshaft 12. The device 100 will be pushed onto the crankshaft 12 until the end of the crankshaft 12 abuts the surface 126. Once the device is secured on the crankshaft 12, a breaker bar or other tool (not shown) is inserted into the square bore 128 so that the breaker bar can be used to turn the crankshaft 12.

Figure 8:
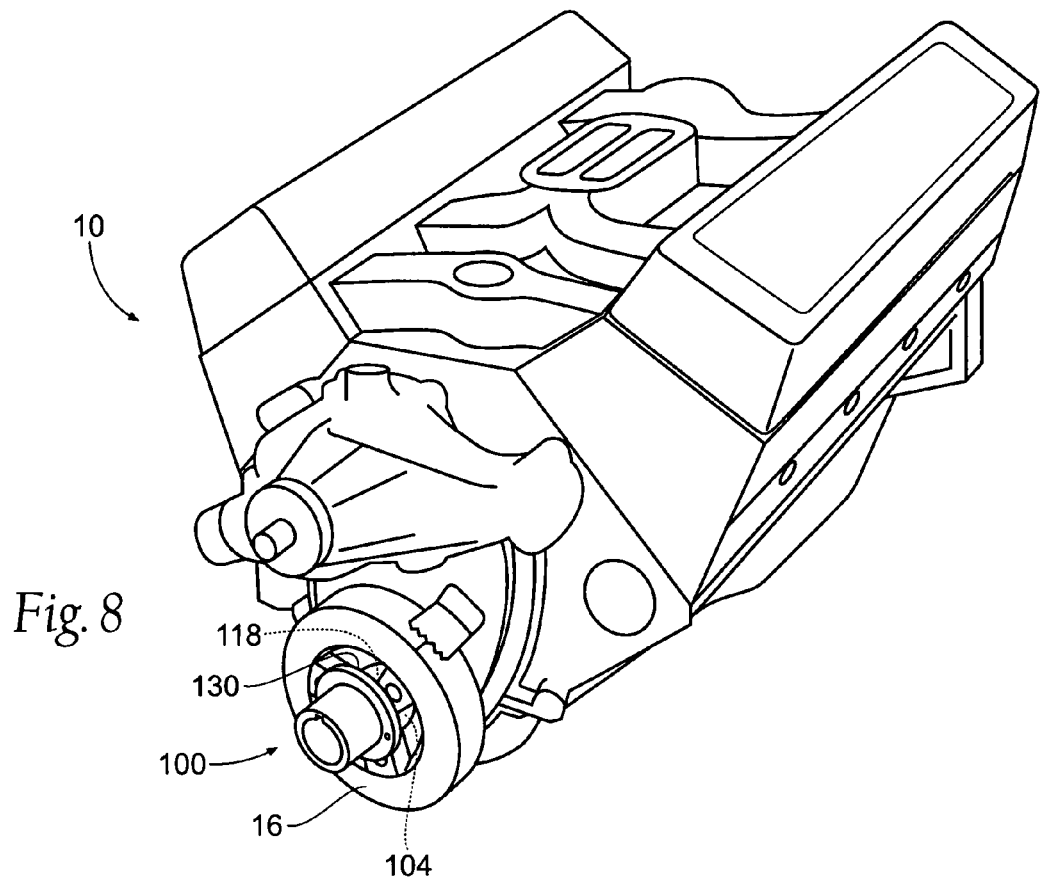
FIG. 8 is a perspective view of the barring device of FIG. 3 together with the engine block of FIG. 2.

FIG. 8 shows the barring device 100 secured to the harmonic balancer 16. The second end portion 104 is inserted into the central opening 20 of the harmonic balancer 16 with the spline 118 aligned with the keyway 18 located in the opening 20. The second end portion 104 will be inserted until the second surface 130 abuts the harmonic balancer 16. Just as was described with respect to FIG. 7, a breaker bar or other tool (not shown) can be inserted into the bore 128 so that the breaker bar can be used to turn the crankshaft 12.

Figure 9:
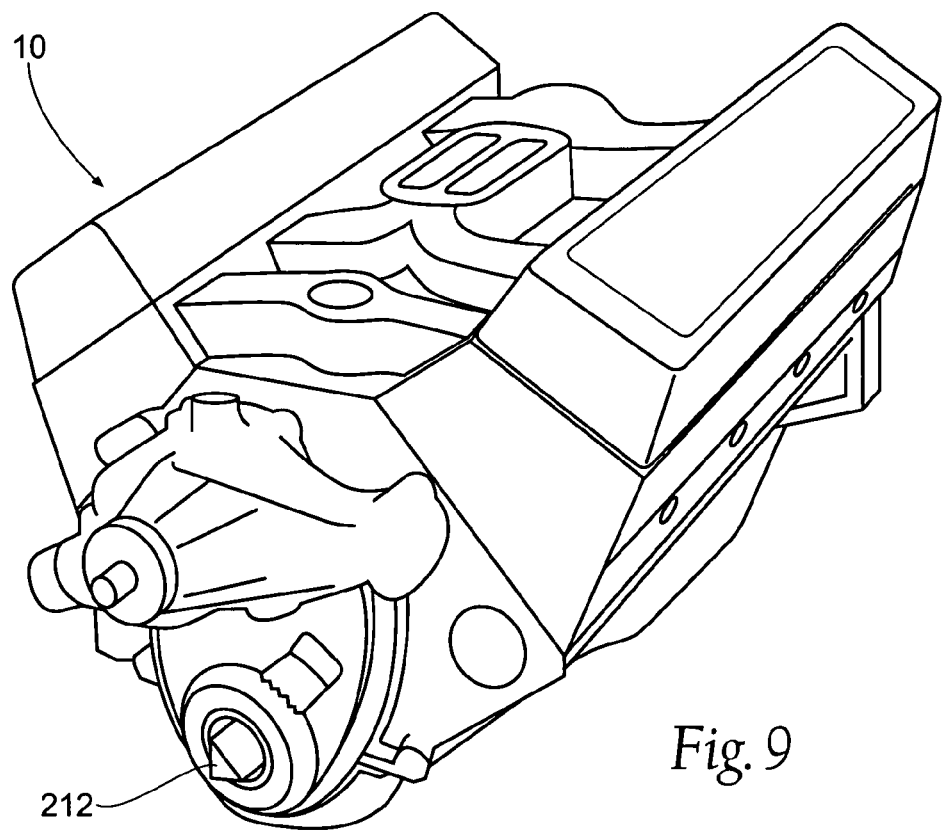
FIG. 9 is a perspective view of an engine without a harmonic balancer attached to the engine and having an alternate crankshaft than shown in FIG. 1.
Figure 10:
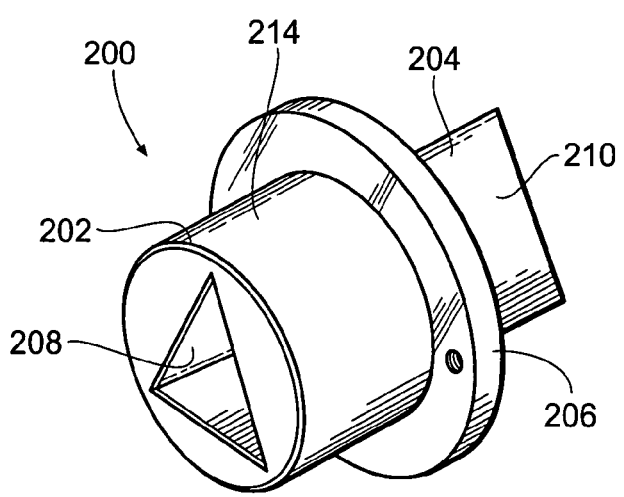
FIG. 10 is a perspective view of an alternate device according to the present invention.

The dimensions of the device 100 can be adjusted as necessary for any size of engine or engine block. For example, FIG. 9 shows the engine having an alternate crankshaft 212. The crankshaft 212 has a triangular shape, which may be common on some foreign made vehicles. FIG. 10 shows an alternate engine turning device 200 having a first end portion 202, a second end portion 204, and a central portion 206. The first end portion 202 has an inner surface 208 having a triangular shape, which allows the first end portion 202 to mate with the crankshaft 212 shown in FIG. 9. The second end portion 204 has a triangular outer surface 210, which would be beneficial for use with a harmonic balancer having a triangular central opening. The device 200 will work and operate with the use of a lever arm, as with the previously discussed device 100 and, also, with a degree wheel 120 and the other features discussed and detailed with the previous embodiment. Provided that a single, unitary engine turning device is capable of being used on an engine, with or without a harmonic balancer positioned on the engine. The mating surfaces of the engine tuning device could be of any shape, such as circular, triangular, hexagonal, square, or other shapes of crankshafts, and still fall within the scope of the present invention.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A device for rotating a crankshaft of an engine by use of a single external lever arm, said crankshaft capable of supporting a harmonic balancer:

said device comprising;
a first open-ended portion arranged to be removably and directly mated with said crankshaft, a second open-ended portion arranged to be removably and directly matable with said harmonic balancer, a central, radially extending portion dividing the first open-ended portion from the second open-ended portion, and a coaxial bore accessible to and removably engagable with the external lever arm for selective rotation of said crankshaft dependent upon relative positioning of a selected open-ended portion with respect to said crankshaft;
wherein said first open-ended portion comprises a cylindrical section having an inner surface, said inner surface further including a coaxial, longitudinally extending, keyway groove which is engagable with a coupling spline formed on the exposed surface of said crankshaft; and,
wherein said second open-ended portion comprises a cylindrical section having an outer surface, said outer surface further including a coaxial, longitudinally extending, spline which is engagable with a keyway formed in the exposed surface of said harmonic balancer.

2. The device according to claim 1, wherein said central portion has a diameter greater than a diameter of said first and said second open-ended portions.

3. The device according to claim 2, further comprising a degree wheel attached to an exposed surface of said intermediate central portion.

4. The device according to claim 1, wherein said inner surface of said first open-ended portion comprises an inner diameter, said inner diameter being sized for engagement with said crankshaft.

5. The device according to claim 1, wherein said outer surface of said second open-ended section being sized to engage said harmonic balancer.

6. The device according to claim 1, further comprising a centrally located square bore for removably receiving said lever arm.

7. A device for rotating a crankshaft of an engine by use of a single external lever arm, said crankshaft capable of supporting a harmonic balancer, said device comprising:

a cylindrical first open-ended portion comprising an inner surface being sized to directly and removably engage said crankshaft;
a cylindrical second open-ended portion comprising an outer surface being sized to directly and removably engage said harmonic balancer;
a central, radially extending portion located between said first open-ended portion and said second open-ended portion; and,
a centrally located bore for removably receiving said lever arm and transmitting torque for rotating said crankshaft or said harmonic balancer.

8. The device according to claim 7, further comprising a degree wheel attachable to a selected one of oppositely facing surfaces of said central, radially extending portion.

9. A device for rotating a crankshaft of an engine by use of a single external lever arm, said crankshaft capable of supporting a harmonic balancer:

said device comprising;
a cylindrical first open-ended portion having a polygonal-shaped inner surface arranged to be removably and directly mated with said crankshaft when said crankshaft is not supporting said harmonic balancer;
a second end portion having a polygonal outer surface arranged to be removably and directly mated with said harmonic balancer when said crankshaft is supporting said harmonic balancer;
a central, radially extending portion located between said first end portion and said second end portion; and,
a conjoining, coaxial bore accessible to and removably engagable with the external lever arm for selective rotation of said crankshaft dependent upon relative positioning of a selected open-end portion with respect to said crankshaft.

10. The device according to claim 9, wherein said inner surface of said first open-ended portion is triangular.

11. The device according to claim 10, wherein said outer surface of said second end portion is triangular.

12. The device according to claim 9, wherein said inner surface of said first open-ended portion is hexagonal, and wherein said outer surface of said second end portion is hexagonal.

* * * * *